United States Patent Office 3,341,938
Patented Sept. 19, 1967

3,341,938
METHOD OF PRODUCING SELENIUM
MIDGET RECTIFIERS
Georg Hoppe, Berlin, and Rainer Dangschat, Munich, Germany, assignors to Siemens-Schuckertwerke Aktiengesellschaft, Berlin-Siemensstadt, Germany, a corporation of Germany
Filed Jan. 27, 1965, Ser. No. 428,395
Claims priority, application Germany, May 6, 1964, S 90,946
1 Claim. (Cl. 29—588)

ABSTRACT OF THE DISCLOSURE

The invention relates to a method of producing selenium midget rectifiers having pellet-shaped rectifier elements and electrodes on opposite sides of the pellet. The method comprises fastening respective connector leads to the external surfaces of the two electrodes by resistance shunt welding and immersing the pellet and the welded junctions in an adherent mixture of epoxide-resin varnish with an admixture of thixotropic material. The coated assembly is removed from the admixture and the resulting envelope is hardened to thereby embed the pellet and the welded ends of the leads in the solidified mixture.

Our invention relates to selenium midget-type rectifiers having tablet or pellet-shaped rectifier elements, each with respective electrodes on opposite sides.

In midget selenium rectifiers, the electric terminal leads, as a rule, are connected with the respective electrodes by means of mechanical pressure contacts. Production and maintenance of contact pressure require the provision of clamps, springs or other tensioning components whose cost are the more appreciable the fewer tablets are contained in a rectifier unit, particularly in single-tablet rectifiers. It has also become known to solder the terminal leads to the selenium rectifier element. This poses serious problems because selenium rectifier elements are thermally sensitive, and it is difficult to properly limit the permissible heat quantity when soldering. Furthermore, the need for using a solder and fluxing agent also contributes essentially to the manufacturing cost.

It is an object of our invention to simplify the production of selenium midget-type rectifiers and to considerably reduce the manufacturing cost without detriment to the reliability of the contact connection between the pellet electrodes and the connecting leads.

According to the invention, respective connecting leads are joined with the bottom and top electrode of a selenium rectifier pellet by resistance shunt welding, and the unit thus formed is embedded in an envelope of synthetic plastic by immersing the unit in the plastic material and then permitting the adhering material to cure and solidify to a rigid body.

The application of resistance shunt welding for fastening the terminal leads to the pellet electrodes affords a narrowly limited localization of the generated heat and an accurate dosing of the heat quantity, thus preventing impairment of the selenium layer which would detrimentally change its condition already at temperatures above 120° C. approximately.

The embedding envelope is preferably formed of a plastic varnish, particularly epoxide-resin varnish, to which thixotropic material is added. Such thixotropic materials, known for similar purposes, consist for example of aluminum-silicates, particularly ammonium alkyl-aluminum silicates, for example bentonites or Fuller's earth. These thickening agents prevent the varnish from dripping off when the previously immersed unit is taken out of the liquid bath and thus permit producing by immersion a sufficiently thick envelope around the rectifier element and the welded localities, thereby relieving the welded localities from any pulling forces as may be applied to the protruding ends of the connecting leads. Such forces are rather taken up by the solidified envelope.

Synthetic plastic varnishes with an addition of bentonite or other thixotropic material have the further advantage that the permeability of the envelope to water vapor is very slight, because the thixotropic materials have the property of retaining water molecules. For achieving this purpose, it is essential that the thixotropic material be admixed to the varnish; not in the usual manner with the aid of an intermediate solvent such as benzene or xylene, because such intermediate solvents, after evaporating, may leave gaps which again permit ingress of humidity or other atmospheric effects to the rectifier element; but rather by adding the thixotropic material directly to the plastic varnish while stirring the resulting mixture.

The invention will be further described by way of example with reference to embodiments of the method and with reference to the accompanying drawing in which.

Figure 1:
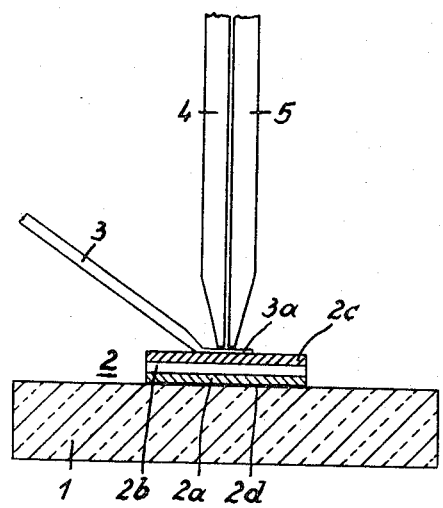
FIG. 1 shows in section a selenium rectifier tablet during resistance shunt welding of one of the connector leads.

The device used according to FIG. 1 for connecting the terminal leads with the rectifier element by resistance shunt welding comprises a base plate 1 of insulating material upon which the selenium rectifier tablet 2 is placed. The tablet is composed of a carrier electrode 2a, a selenium layer 2b and a cover electrode layer 2c. The carrier electrode 2a preferably consists of aluminum. Its bottom side is coated with a thin spray-deposited layer 2d of soft solder as usually employed for improving the contact formation. The cover electrode 2c, as a rule, consists of tin-cadmium alloy which, depending upon its composition, may have a melting point between about 180 and 240° C. The layer 2d may consist of the same tin-cadmium alloy.

The connecting lead 3 consists for example of a wire of silver- or tin-coated copper. Its end 3a to be welded is squeezed flat. The welding electrodes 4 and 5 extend parallel at a short distance from each other and their respective tips, during welding, are placed upon mutually close but separate points of the flattened end portion 3a on top of the electrode 2c. It will be seen that a welding-current passing between the electrodes 4 and 5 will flow only through the immediate vicinity of the welding locality so that the material of the cover electrode 2c is fused only superficially to form a rigid junction with the connecting lead 3.

The connection of another lead with the carrier electrode 2a is produced in the same manner.

Figure 2:
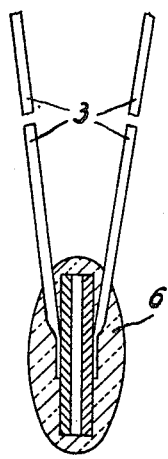
FIG. 2 shows in section a completed rectifier made according to the method of the invention.

The unit thus formed is immersed into a liquid epoxide resin of the commercially available type, containing a hardener and an addition of thixotropic material, while the unit is being held at the connecting leads 3 of which only the welded ends are immersed in the liquid. When the unit is thereafter lifted out of the varnish bath, a relatively thick and buttery varnish coating adheres around the element 2, which varnish coating does not drip off. The varnish is now cured and hardened by subjecting the unit to elevated temperature up to about 80° C. The completed rectifier then has the selenium pellet with the welded ends of the leads 3 embedded in a solid and rigid envelope of plastic material as illustrated in FIG. 2 where the envelope is denoted by 6.

Figure 3:
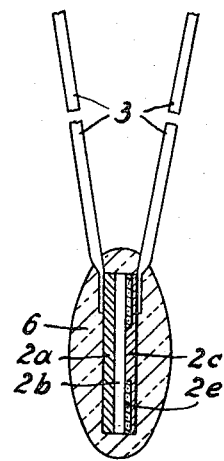
FIG. 3 shows in section a different embodiment of the selenium rectifier also made by the method of the invention.

The method is also applicable with selenium tablets in which the active rectifier surface is reduced by means of an insulating layer inserted between the selenium layer and the cover electrode. With such tablets, the connecting leads are preferably welded to the non-active region of the tablet. The embodiment illustrated in FIG. 3 is of this type. The selenium tablet 2 consists of the carrier electrode 2a, the selenium layer 2b and a centrally apertured insulating layer 2e, and the cover electrode 2c. The connecting leads are welded to the marginal portion of the respective electrodes and thus in the region where the ring-shaped insulating layer 2e is located.

The above-mentioned varnish composition may be prepared in the following manner. A commercial epoxide varnish containing a hardener is kept stirred while an amount of pulverulent thixotropic material is being gradually added and stirred into the varnish. Employed as such material are bentonites. The amount thus gradually added, as a rule, is about 20 to 30% by weight. No auxiliary solvent is used. The proportion of the thixotropic addition, however, may be less than 20% or up to 50% by weight. The particular quantity is not critical and is preferably determined for each particular epoxide varnish by slowly adding the pulverulent bentonite until sample testing shows that the mixture will not drip off when removing a specimen from the liquid.

Also applicable in the same manner are zeolites. Various other plastic embedding masses are also applicable. Among these are silicone-rubber casting and potting masses to which an aluminum silicate such as bentonite in an amount of 1 to 10% by weight is added under stirring, before adding the desired hardener to the mixture. Further suitable is a mass consisting of silicon oil such as a mixture of low-polymer methyl polysiloxane. This silicone oil is mixed with 1 to 5% by weight of a hardener, for example dibutyl-tin-dilaurate dissolved in tetraethoxysilane. This mixture is added to an epoxide casting resin containing an ion-exchanger substance. The resulting bath composition may contain 50 to 98 parts of epoxide casting or potting resin, 1 to 10 parts of the above-mentioned mixture of silicone oil and hardener, and 1 to 40 parts of ion exchange material such as the above-mentioned bentonite.

We claim:

Method of producing selenium midget rectifiers having pellet-shaped rectifier elements and electrodes on opposite sides of the pellet, which comprises fastening respective connector leads to the external surfaces of the two electrodes by resistance shunt welding, immersing the pellet and the welded junctions in an adherent mixture of epoxide-resin varnish with an admixture of thixotropic material, removing the coated assembly from said mixture, and hardening the resulting envelope to thereby embed the pellet and the welded ends of the leads in the solidified mixture.

References Cited
UNITED STATES PATENTS

| | | | |
|---|---|---|---|
| 2,998,558 | 8/1961 | Maiden | 29—25.3 X |
| 3,117,364 | 1/1964 | Black | 29—25.42 |
| 3,181,229 | 5/1965 | Haberecht | 29—155.5 |

WILLIAM I. BROOKS, *Primary Examiner.*